(12) United States Patent
Kouta

(10) Patent No.: US 6,215,580 B1
(45) Date of Patent: Apr. 10, 2001

(54) WAVELENGTH CONVERTER FOR GENERATING OPTICAL HARMONICS OF INCIDENT LASER LIGHT AT HIGH EFFICIENCY AND METHOD FOR VARYING WAVELENGTH OF INCIDENT LASER LIGHT

(75) Inventor: Hikaru Kouta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/199,059

(22) Filed: Nov. 24, 1998

(30) Foreign Application Priority Data

Nov. 26, 1997 (JP) .................................................... 9-324398

(51) Int. Cl.⁷ ........................................................ G02F 1/37
(52) U.S. Cl. ............................................ 359/328; 359/326
(58) Field of Search .................................. 359/326–332; 372/21, 22; 385/122

(56) References Cited

U.S. PATENT DOCUMENTS

| | | | |
|---|---|---|---|
| 5,047,668 | 9/1991 | Bosenberg | 359/330 |
| 5,136,597 * | 8/1992 | Nightingale | 372/21 |
| 5,144,630 * | 9/1992 | Lin | 372/22 |
| 5,276,548 * | 1/1994 | Margalith | 359/330 |
| 5,309,454 | 5/1994 | Taira | 372/21 |
| 5,325,229 * | 6/1994 | Millard | 359/330 |
| 5,459,744 | 10/1995 | Hayashi | 372/21 |
| 5,511,085 | 4/1996 | Marshall | 372/22 |
| 5,521,375 * | 5/1996 | Jang | 359/328 X |
| 5,742,626 * | 4/1998 | Mead et al. | 372/22 |
| 5,835,513 * | 11/1998 | Pieterse et al. | 372/22 |

FOREIGN PATENT DOCUMENTS

| | | |
|---|---|---|
| 50-150453 | 12/1975 | (JP) . |
| 63-055990 | 3/1988 | (JP) . |
| 2-202079 | 8/1990 | (JP) . |
| 4-157778 | 5/1992 | (JP) . |
| 5-41557 | 2/1993 | (JP) . |
| 5-267753 | 10/1993 | (JP) . |
| 6-29595 | 2/1994 | (JP) . |
| 6-120586 | 4/1994 | (JP) . |
| 6-252495 | 9/1994 | (JP) . |
| 6-301426 | 10/1994 | (JP) . |
| 8-213689 | 8/1996 | (JP) . |
| 9-211512 | 8/1997 | (JP) . |

OTHER PUBLICATIONS

V. Kisand et al., "Low Temperature Optical Spectroscopy of Nonlinear BBO Crystals", pp. 542–544, Physica Scripta, vol. 54, No. 5, Nov. 1996.

* cited by examiner

*Primary Examiner*—John D. Lee
(74) *Attorney, Agent, or Firm*—Young & Thompson

(57) ABSTRACT

Nonlinear optical crystal of beta-$BaB_2O_4$ is available for generating optical harmonics of incident laser light, and an absorption spectrum shifter, a heat sink and a walk-off angle compensator are selectively provided for the non-linear optical crystal for increasing the efficiency of generating the optical harmonics.

33 Claims, 14 Drawing Sheets

WAVELENGTH CONVERTER FOR GENERATING OPTICAL HARMONICS OF INCIDENT LASER LIGHT AT HIGH EFFICIENCY AND METHOD FOR VARYING WAVELENGTH OF INCIDENT LASER LIGHT

FIELD OF THE INVENTION

This invention relates to a wavelength converting technology and, more particularly, to a wavelength converter for laser light and a method for varying the wavelength of laser light.

DESCRIPTION OF THE RELATED ART

The laser light has found a wide variety of application such as, for example, semiconductor device fabrication technologies and a medical equipment. These applications require short-wavelength laser light, and research and development efforts have been made on a wavelength converter or a frequency converter for obtaining short-wavelength laser light.

While a wavelength converter is converting the wavelength of incident laser light, the wavelength converter generates heat due to various kinds of absorption such as, for example, two-photon absorption. If the wavelength of the incident light to be converted is close to absorption edge, the transmittance is small, and part of the incident light is absorbed by the wavelength converter. The heat is undesirable for the wavelength converter, because the heat is causative of decreasing the refractive index of the crystal of the wavelength converter. The decrease of the refractive index destroys the phase matching conditions and, accordingly, the wavelength converter decreases the power of the converted light. Thus, it is important to keep the temperature of the wavelength converter constant for stable wavelength conversion.

In order to control the temperature of the wavelength converter, the wavelength converter is accommodated in a holder formed of heat conductive material such as copper or aluminum, and an oven or a coolant keeps the holder in a temperature range through a feed-back control. Especially, when the wavelength converter is formed of material widely varied in refractive index with the temperature, it is necessary to strictly control the temperature within a narrow temperature range. In this instance, Japanese Patent Publication of Unexamined Application NO. 5-41557 proposes to embed the wavelength converter in a Peltier element, and the Peltier element keeps the wavelength converter in the narrow temperature range.

Although enlargement of crystal is effective against the decrease of the converting efficiency, the walk-off due to the double refraction characteristics of the enlarged crystal sets a limit on the converting efficiency, and the enlargement becomes invalid at a certain length. Japanese Patent Publication of Unexamined Application No. 50-150453 and U.S. Pat. No. 5,047,668 propose to use more than one element oriented in respective directions different at 180 degrees from a phase matching direction for compensating the walk-off.

In this situation, even though the short-wavelength laser light is required in the various technical fields, it is difficult to take out the short-wavelength laser light from the incident light. First, the dispersion of refractive index and the wavelength at the absorption edge are inherent in the material used for the wavelength converter, and they restricts the wavelength range of an optical harmonic to be generated. Even if a kind of material allows the wavelength converter to convert incident light to a wavelength close to the absorption edge, the dispersion of refractive index is so large around the absorption edge, and the wavelength converter suffers from low transmittance due to the absorption and the surface reflection loss. This means a low efficiency in the wavelength conversion. Second, the absorption during the wavelength conversion is causative of the temperature rise, and the temperature rise destroys the phase matching conditions, and a break-down is liable to take place due to the electron avalanche phenomenon. For this reason, the wavelength conversion around the absorption edge is not practical.

As described hereinbefore, there is a tendency that allowable refractive index range is narrowed when the temperature rises. Similar tendency is observed in the wavelength and the phase matching angle. For this reason, the wavelength conversion for short wavelength light is quite difficult. Moreover, a wavelength converter suffers from a large walk-off angle due to the double refraction, and the threshold of the dielectric breakdown is lowered. For this reason, it is difficult to enhance the wavelength conversion efficiency by prolonging the crystal length and increasing the energy density in the wavelength converter. Although the compensation of the walk-off angle is tried by using two elements, the compensation method is complicated, and a simple method is required for enhancing the converting efficiency in the wavelength conversion.

Moreover, when the wavelength conversion is carried out for ultraviolet light, the two-photon energy exceeds the band gap of the material used for the wavelength converter, and the wavelength converter generates heat at high efficiency due to the two-photon absorption. The heat varies the refractive index of the wavelength converter, and the phase matching conditions are destroyed. As a result, the wavelength converter decreases the output of the converted light. High power ultra violet light is required for industrial applications, and it is necessary to effectively control the temperature of the wavelength converter.

Light is transmitted through a portion where the heat is generated. The prior art temperature control system indirectly cools the portion, i.e., from the surrounding portion to the heat generating portion. The material used for the wavelength converter is small in heat conductivity, and the prior art temperature control system can not exactly control the temperature of the heat generating portion.

When 193 nm wavelength ultra violet light is generated from beta-$BaB_2O_4$, which has large nonlinear optical constant, the ultra violet light has the wavelength close to the absorption edge of the beta-$BaB_2O_4$, and the transmittance for the 193 nm wavelength light is of the order of 25 percent. This means that a large amount of heat is generated from the wavelength converter. The 193 nm wavelength light is Ar-F excimer laser light, and the Ar-F excimer laser light is expected to participate photo-lithography used for semiconductor devices in the next generation. However, the Ar-F excimer laser generator is low in electric-to-optic converting efficiency, and the manufacturer requires a suitable protective system against dangerous gas. For this reason, the Ar-F excimer laser generator occupies wide area, and the running cost is high. Thus, the manufacturer wants to replace the Ar-F excimer laser generator with a solid-state laser generator of beta-$BaB_2O_4$ so as to reduce the installation cost, the running cost and the safety cost and improve the space utility of a clean room.

SUMMARY OF THE INVENTION

It is therefore an important object of the present invention to provide a wavelength converter, which achieves a high converting efficiency.

It is also an important object of the present invention to provide a method for converting the wavelength of light at a high converting efficiency.

The present inventor found that beta-BaB$_2$O$_4$ shifted the absorption edge toward a short-wavelength region under low-temperature condition. The shift improved the transmittance around the absorption edge. The light was less absorbed, and the wavelength converter reduced the amount of heat generated in the wavelength conversion. In other words, the converting efficiency was improved. The present inventor proposed to cool the wavelength converter so as to take out short wavelength light from the wavelength converter at a high converting efficiency.

The present inventor further noticed that the walk-off angle was made invalid by using optical paths different at 180 degrees from one another with respect to an optical axis of a wavelength converting element. The present inventor increased the total length of the optical paths under the above optical conditions, and achieved a high converting efficiency.

In accordance with one aspect of the present invention, there is provided a wavelength converter comprising, a wavelength converting path formed of material having a nonlinear optical crystal for generating an optical harmonic of an incident light and a converting efficiency increasing means including at least one of a spectrum shifter for changing a part of an absorption spectrum in the vicinity of an absorption edge toward a shorter wavelength, a heat sink providing a part of an optical path propagating said incident light for directly absorbing heat generated in the wavelength converting path and a walk-of angle compensator for making influences of a walk-off phenomenon between a first part of the wavelength converting path and a second part of the wavelength converting path invalid.

In accordance with another aspect of a method for converting an incident light to a converted light different in wavelength from the incident light comprising the steps of cooling a wavelength converting path formed of a material having a nonlinear optical crystal to a certain low temperature for shifting an absorption edge of an absorption spectrum observed in the nonlinear optical crystal to a short wavelength, supplying the incident light to an incident end of the wavelength converting path, generating an optical harmonic during propagation along the wavelength converting path so as to covert the incident light to the converted light and radiating the converted light from an outlet end of the wavelength converting path.

In accordance with yet another aspect of the present invention, there is provided a method for converting an incident light to a converted light different in wavelength from the incident light comprising the steps of supplying the incident light to an incident end of the wavelength converting path, absorbing heat from the wavelength converting path during generation of an optical harmonic from the incident light so as to keep a refractive index of the wavelength converting path constant and radiating the converted light from an outlet end of the wavelength converting path.

In accordance with still another aspect of the present invention, there is provided a method for converting an incident light to a converted light different in wavelength from the incident light comprising the steps of preparing a plurality of optical paths formed in a bulk of nonlinear optical crystal and 180 degrees different from one another with respect to an optical axis of the bulk of nonlinear optical crystal, supplying an incident light to an incident end of one of the plurality of optical paths, generating an optical harmonic during propagation along the one of the plurality of optical paths so as to covert the incident light to a partially converted light, transferring the partially converted light from the one of the plurality of optical paths to another of the plurality of optical paths, generating an optical harmonic during propagation along the another of the plurality of optical paths so as to covert the incident light to a converted light and radiating the converted light from an outlet end of the another of the plurality of optical paths.

BRIEF DESCRIPTION OF THE DRAWINGS

The features and advantages of the wavelength converter and the method will be more clearly understood from the following description taken in conjunction with the accompanying drawings in which.

DESCRIPTION OF THE PREFERRED EMBODIMENTS

Wavelength Conversion to Short Wavelength Light

Figure 1:
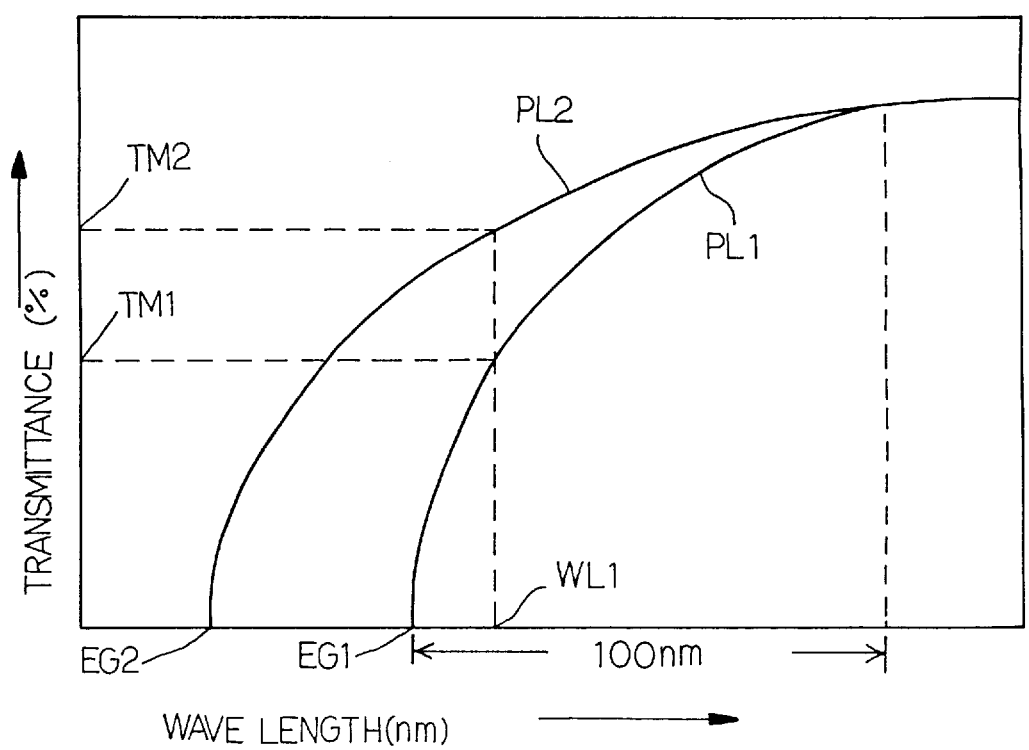
FIG. 1 is a graph showing an absorption spectrum observed in a wavelength converter at different temperatures.

FIG. 1 illustrates the absorption spectrum affected by the temperature. Plots PL1 is representative of the absorption spectrum at room temperature, and the absorption edge at the room temperature is indicated by EG1. In the wavelength region from the absorption edge EG1 to the wavelength 100 nm longer than the absorption edge EG1, the refractive index is increased, and, accordingly, a large amount of surface reflection takes place. The incident light is absorbed by the wavelength converter, and the transmittance is abruptly decayed in the wavelength region as indicated by plots PL1.

The absorption spectrum at 0 degree in centigrade and below is represented by plots PL2, and the absorption edge is at EG2. The plots PL2 for the wavelength region is leftwardly shifted from the plots PL1. A wavelength converter is allowed to output a light component close to the absorption edge EG1, the transmittance for the converted light at WL1 is increased from TM1 to TM2. The amount of heat generated by the wavelength converter is inversely proportional to the transmittance. For this reason, when the wavelength converter is cooled at 0 degree in centigrade and less, the amount of heat is surely decreased, and the dielectric breakdown is effectively restricted. Thus, the low temperature environment is desirable for generating a high-order optical harmonic, and the appropriate low temperature range is dependent on the nonlinear optical crystal. The upper limit of the desirable low temperature range for the ultra violet light is not higher than 0 degrees in centigrade.

Figure 2:
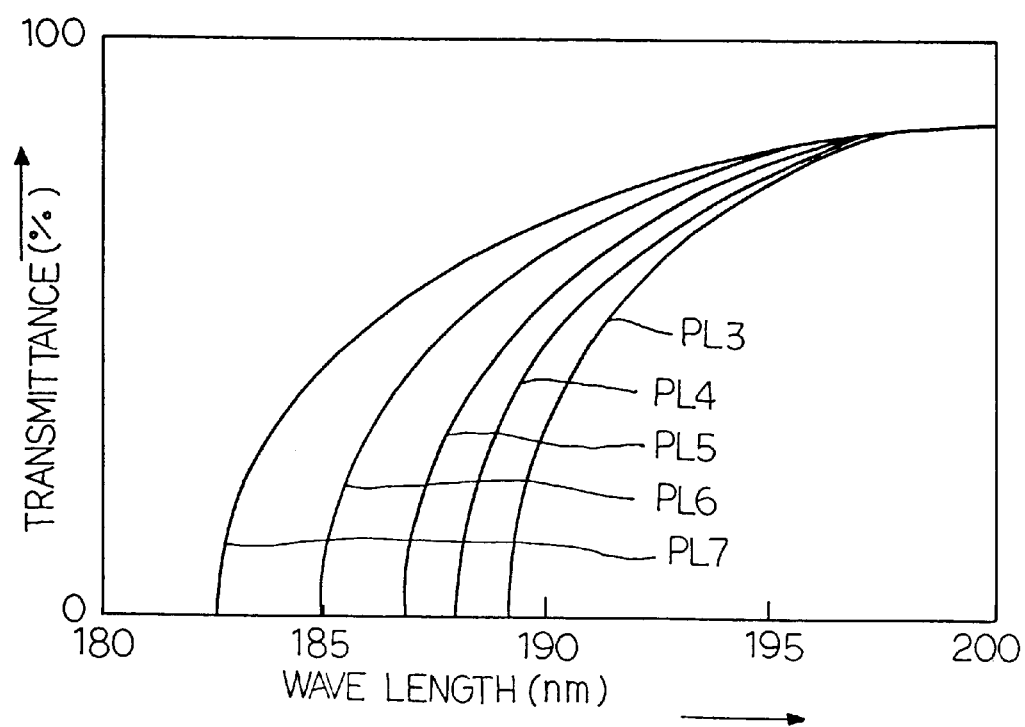
FIG. 2 is a graph showing the shift of an absorption spectrum observed in a wavelength converter formed of beta-BaB$_2$O$_4$.

When the wavelength converter is formed of beta-$BaB_2O_4$, the absorption spectrum is shifted toward short wavelength as represented by plots PL3, PL4, PL5, PL6 and PL7. When the wavelength converter is operating at room temperature, the absorption spectrum is varied as represented by plots PL3. If the temperature is decreased from the room temperature through 0 degree, –50 degrees and –100 degrees to –150 degrees in centigrade, the absorption spectrum for 10 nm from the absorption edge is leftwardly shifted from PL3 through PL4, PL5 and PL6 to PL7. The absorption edge at the room temperature is at the 189 nm. The absorption edge is shifted to 188 nm at 0 degrees in centigrade, 187 nm at –50 degrees in centigrade, 185 nm at –100 degrees in centigrade and 183 nm at –150 degrees in centigrade. The leftward shift of the absorption edge means that the wavelength converter is able to generate a target optical harmonic of incident laser light. Moreover, the wavelength converter reduces the absorption. Therefore, the wavelength converter stably generates the optical harmonic at a high converting efficiency. Thus, the wavelength converter cooled at 0 degrees and less achieves a wavelength conversion to the ultra violet output light at a high converting efficiency. In FIGS. 1 and 2, "room temperature represents 0 degrees to 30 degrees in centigrade.

Wavelength Converter

In the description on the walk-off, term "optical axis" means an optical axis of crystal, and is different from the optical axis of laser light.

First Embodiment

Figure 3:
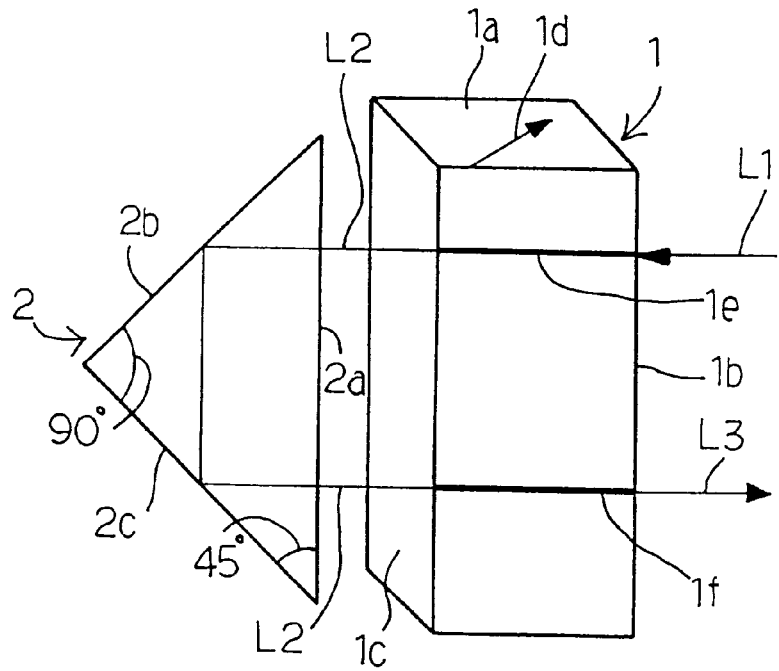
FIG. 3 is a schematic view showing a wavelength converter according to the present invention.

FIG. 3 illustrates a wavelength converter embodying the present invention. The wavelength converter comprises a wavelength converting element 1 and a prism 2. In this instance, the wavelength converting element is formed of beta-$BaB_2O_4$, and the prism 2 is formed of quartz.

The wavelength converting element 1 is shaped in an appropriate configuration to have a phase matching angle where optical harmonic of incident laser light L1 are obtainable. The wavelength element 1 has an upper surface 1a, a front surface 1b and a back surface 1c, and the optical axis 1d is on the upper surface 1a. The laser light L1 is incident on the front surface 1b, and is propagated through a first wavelength converting region 1e. While the laser light L1 is being propagated through the first wavelength converting region 1e, the first wavelength converting region 1e generates an optical harmonic, and converts the laser light L1 to a partially converted laser light L2. The partially converted laser light L2 is radiated from the back surface 1c to the prism 2, and returns from the prism 2 to the wavelength converting element 1. The partially converted laser light L2 is incident on the back surface 1c, and is propagated through a second wavelength converting region 1f. While the second wavelength converting region 1f is propagating the partially converted laser light L2, the second wavelength converting region 1f generates the optical harmonic, and converts the partially converted laser light L2 to fully converted laser light L3, and the fully converted laser light L3 is radiated from the front surface 1b.

The optical path along the first wavelength converting region 1e is different at 180 degrees from the optical path along the second wavelength converting region 1f with respect to the optical axis 1d, and, accordingly, the first wavelength converting region 1e and the second wavelength converting region 1f compensate the walk-off angle. Moreover, the first wavelength converting region 1e and the second wavelength converting region 1f make the wavelength converting element 1 equivalent to a wavelength converting element twice longer than the wavelength converting element 1. Thus, the wavelength converting element 1 is smaller than the prior art wavelength converting element and free from the trouble due to the walk-off angle. This results in a high converting efficiency.

The prism 2 is expected to form parallel optical paths in the wavelength converting element 1. However, the prism 2 does not participate in the wavelength conversion. The prism 2 has an incident surface 2a, a first reflecting surface 2b and a second reflecting surface 2c, and the first reflecting surface 2b is inclined to the second reflecting surface 2b at right angle. For this reason, the partially converted laser light L2 is reflected on the first reflecting surface 2b and the second reflecting surface 2c, and is output from the incident surface 2a. The optical path from the incident surface 2a to the first reflecting surface 2b is in parallel to the optical path from the second reflecting surface 2c to the incident surface 2a.

As will be understood from the foregoing description, the prism 2 causes the wavelength converting element 1 to provide the optical paths in the first wavelength converting region 1e and the second wavelength converting region 1f, and the optical paths are different at 180 degrees from one another with respect to the optical axis 1d. This results in that the total optical path is twice prolonged without the trouble due to the walk-off angle. As a result, the converting efficiency is improved.

Second Embodiment

Figure 4:
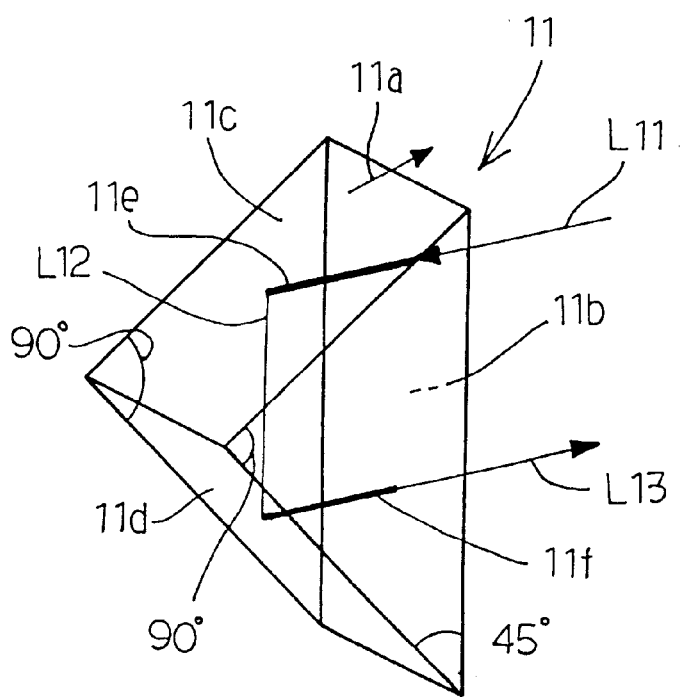
FIG. 4 is a schematic view showing another wavelength converter according to the present invention.

FIG. 4 illustrates another wavelength converter 11 embodying the present invention. The wavelength converter 11 is formed of beta-$BaB_2O_4$, and is shaped in a triangular prism. An optical axis 11a is oriented in such a manner that the wavelength converter 11 has wavelength converting regions directed in the phase matching direction.

The wavelength converter 11 has an incident surface 11b, a first reflecting surface 11c and a second reflecting surface 11d. Laser light L11 is perpendicularly incident on the incident surface 11a, and the optical axis 11a is normal to the incident surface 11a. The first reflecting surface 11c is inclined to the second reflecting surface 11d at right angle, and the first reflecting surface 11c and the second reflecting surface 11d are inclined to the incident surface 11b at 45 degrees. The first reflecting surface 11c and the second reflecting surface 11d reflect the laser light, and form two optical paths parallel to each other in the wavelength converter 11. A part of the wavelength converter 11 for one optical path serves as a first wavelength converting region 11e, and another part of the wavelength converter 11 for the other optical path serves as a second wavelength converting region 11f. The first wavelength converting region 11e and the second wavelength converting region 11f are oriented to the phase matching angle, and are 180 degrees different from each other with respect to the optical axis 11a.

Assuming now that the laser light L11 is incident on the incident surface 11b, the incident laser light L11 is propagated along the optical path in the first wavelength converting region 11e, and is reflected on the first reflecting surface 11c. While the first wavelength converting region 11e is propagating the laser light L11, an optical harmonic is generated, and the incident larger light L11 is converted to partially converted laser light L12. The partially converted laser light L12 is reflected on the first reflecting surface 11c, and is propagated toward the second reflecting surface 11d. The second reflecting surface 11d reflects the partially converted laser light L12, and the partially converted laser light L12 is propagated along the optical path in the second wavelength converting region 11f. While the partially converted laser light L12 is proceeding along the optical path, the second wavelength converting region 11f generates the optical harmonic, and converts the partially converted laser light L12 to fully converted laser light L13. The fully converted laser light L13 is radiated from the incident surface 11b. The triangular prism configuration twice prolongs the wave converting regions 11e/11f.

As will be understood from the foregoing description, the wavelength converter 11 converts the incident laser light L11 to the fully converted laser light L13 at a high converting efficiency, and is smaller than the first example.

Third Embodiment

Figure 5:
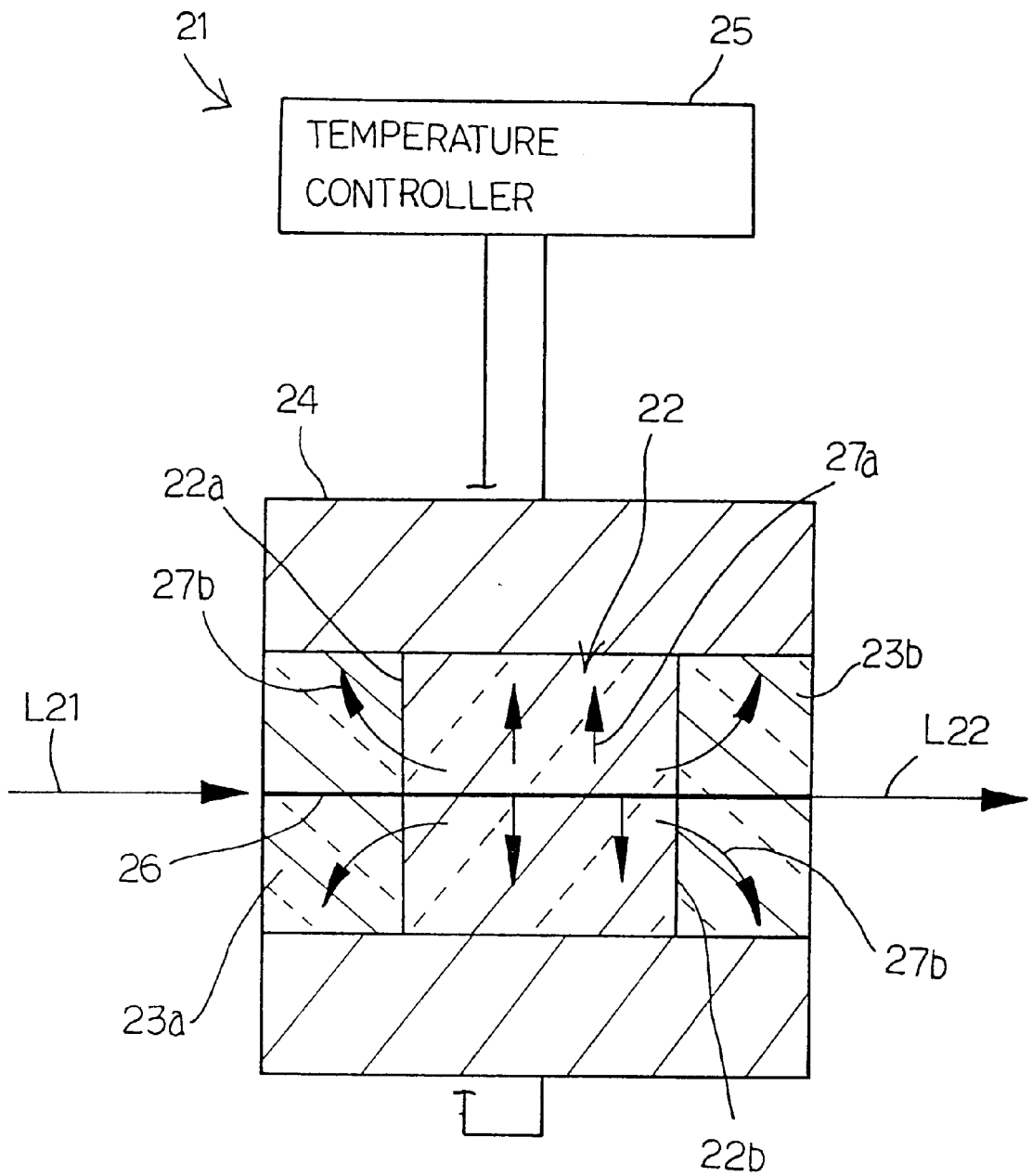
FIG. 5 is a cross sectional view showing yet another wavelength converter according to the present invention.

FIG. 5 illustrates yet another wavelength converter 21 embodying the present invention. The wavelength converter 21 comprises a wavelength converting element 22, heat conductive plates 23a/23b, a metal holder 24 and a temperature controller 25. The wavelength converting element 22 is formed of beta-BaB$_2$O$_4$, and is shaped into a column configuration. The wavelength converting element 22 has an incident surface 22a and an outlet surface 22b opposite to the incident surface 22a, and the incident surface 22a and the outlet surface 22b are polished. The heat conductive plates 23a/23b are disk-shaped, and are formed of material selected from the following table.

TABLE

| Material | Heat Conductivity (w/mk° C.) | Absorption Edge (nm) |
|---|---|---|
| Diamond | 30 | 220 |
| Alimina | 21 | 160 |
| Quartz | 9 | 180 |
| Garnet | 12 | 300 |

The disk-shaped heat conductive plates 23a/23b are fixed to the polished incident surface 22a and the polished outlet surface 22b, respectively, and an optical path 26 extends through the heat conductive plate 23a, the wavelength converting element 22 and the heat conductive plate 23b as shown. The wavelength converting element 22 assembled with the heat conductive plates 23a/23b has a column configuration. Another wavelength converting element sandwiched between heat conductive plates may be shaped into a rectangular parallelopiped configuration.

The metal holder 24 is formed of heat conductive metal such as copper or aluminium, and is shaped into a cylindrical configuration. The wavelength converting element 22 sandwiched between the heat conductive plates 23a/23b is snugly received in the hollow space of the metal holder 24, and the temperature controller 25 regulates the temperature of the wavelength converting element 22 to the appropriate value as described in conjunction with FIG. 2.

The temperature controller 25 is, by way of example, implemented by a recirculating system for coolant such as water or liquid nitrogen, an oven, a Peltier element or a combination thereof.

Incident laser light L21 is incident on the outer surface of the heat conductive plate 23a, and the incident laser light L21 is propagated along the optical path 26. While the incident laser light L21 is passing through the part of the optical path in the wavelength converter 22, the wavelength converter 22 generates an optical harmonic of the incident laser light, and converts the incident laser light L21 to converted laser light L22 different in wavelength from the incident laser light L21. The converted laser light L21 is radiated from the outlet end of the optical path 26 in the outer surface of the heat conductive plate 23b.

While the wavelength converting element 22 is generating the optical harmonic, heat is generated in the wavelength converting element 22. The heat fluxes 27a/27b are radiated from the optical path 26 into the wavelength converting element 22. The heat fluxes 27a is directly absorbed by the metal holder 24 cooled by the temperature controller 25. The heat conductive plates 23a/23b are so large in heat conductivity that the heat fluxes 27b are attracted toward the heat conductive plates 23a/23b. As a result, a large amount of heat is absorbed by the metal holder 24. In other words, the heat conductive plates 23a/23b allow the wavelength converting element 22 to generate the optical harmonic in the appropriate temperature range.

As will be understood from the foregoing description, the heat conductive plates 23a/23b enhances the heat radiation capability of the wavelength converter 21, and the wavelength converter 21 appropriate cooled does not decrease the transmittance. For this reason, the wavelength converter 21 achieves a high converting efficiency.

Fourth Embodiment

Figure 6:
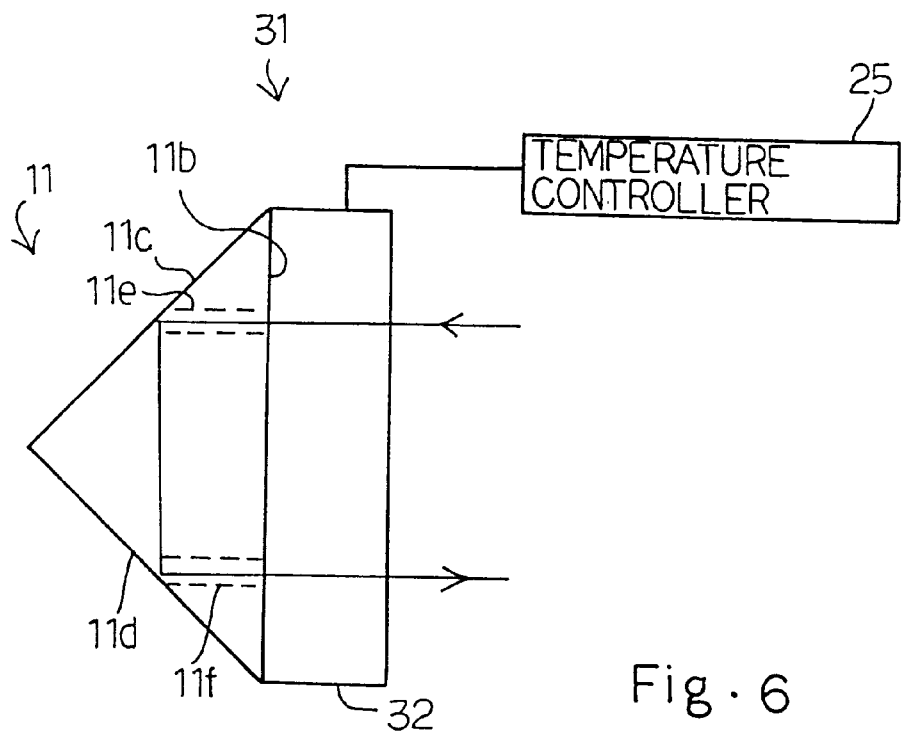
FIG. 6 is a side view showing still another wavelength converter according to the present invention.

FIG. 6 illustrates another wavelength converter 31 embodying the present invention. The wavelength converter 31 is a combination between the second embodiment and the third embodiment. A heat conductive plate 32 is attached to the incident surface 11b of the a triangular prism 11, and the temperature controller 25 is connected to the heat conductive plate 32. The incident surface 11b is rectangular, and, accordingly, the heat conductive plate 32 has a rectangular parallelopiped configuration. The heat conductive plate 32 is formed of the material listed in the above table.

The heat conductive plate 32 attracts the heat generated in the triangular prism 11, and the wavelength converting regions 11e/11f is maintained in the appropriate temperature range. For this reason, the wavelength converter 31 achieves a high converting efficiency by virtue of the temperature control and the cancellation of the walk-off.

Fifth Embodiment

Figure 7:
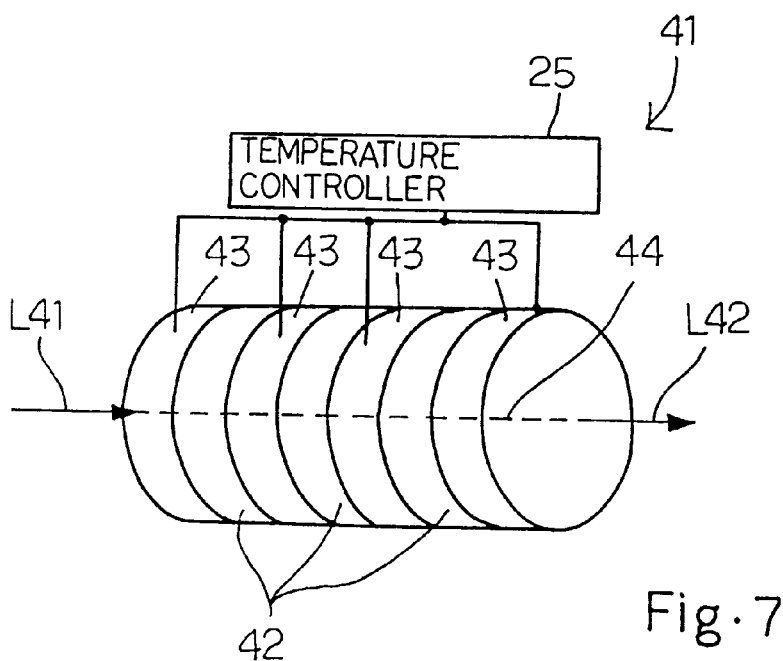
FIG. 7 is a schematic view showing another wavelength converter according to the present invention.

FIG. 7 illustrates another wavelength converter 41 embodying the present invention. The wavelength converter 41 comprises plural disk-shaped wavelength converting elements 42, disk-shaped heat conductive plates 43 and the temperature controller 25. The disk-shaped wavelength converters 42 are formed of material having a nonlinear optical crystal such as, for example, beta-$BaB_2O_4$. The disk-shaped heat conductive plates 43 are transparent to incident laser light L41 and converted laser light L42, and are larger in heat conductivity than the material with the nonlinear optical crystal. The disk-shaped wavelength converting elements 42 are alternately arranged with the disk-shaped heat conductive plates 43, and an optical path 44 extends through the wavelength converter 41 as shown.

Laser light L41 is incident on the incident surface of the outermost disk-shaped heat conductive plate 43, and is propagated along the optical path 44 toward the outlet end. While the laser light is passing through the wavelength converting elements 42, the wavelength converting elements 42 generates an optical harmonic, and the incident laser light L41 is converted to converted laser light L42. The disk-shaped heat conductive plates 43 attracts the heat generated during the generation of the optical harmonic, and the phase matching conditions are not destroyed. For this reason, the wavelength converter 41 achieves a high converting efficiency. Especially, the disk-shaped heat conductive plates 43 allow the manufacturer to prolong the optical path 44, and the wavelength converter 41 is appropriate for the ultra violet light.

Sixth Embodiment

Figure 8:
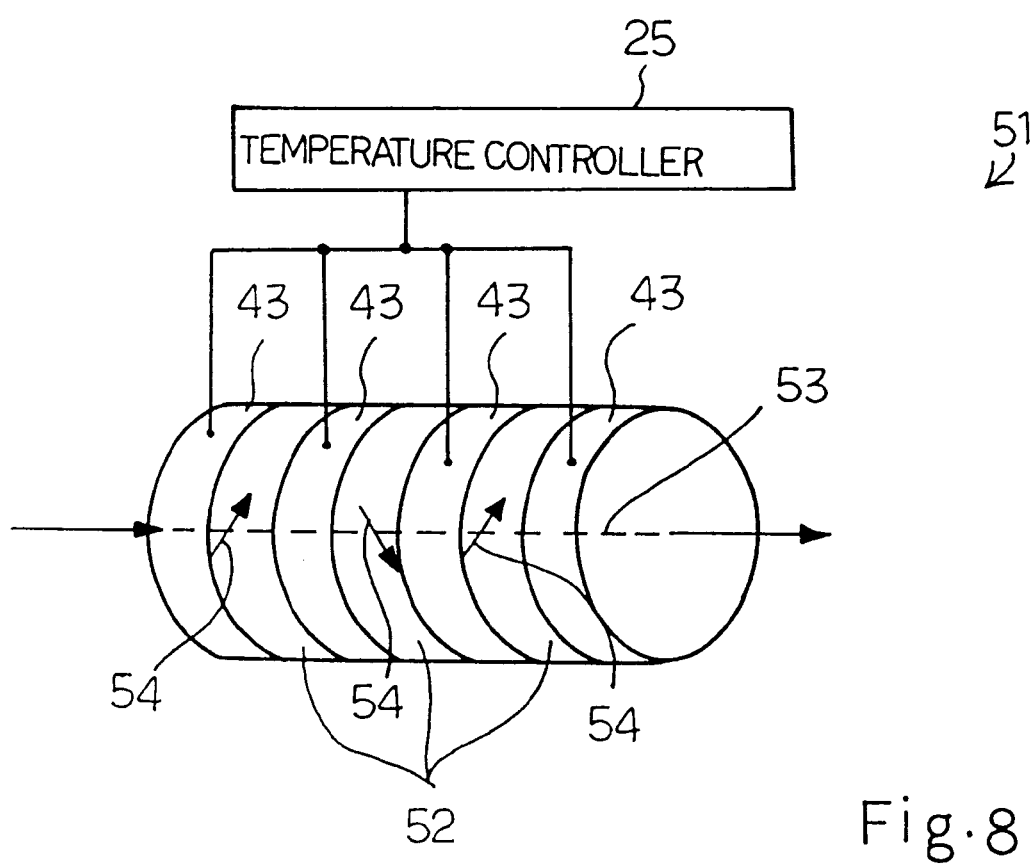
FIG. 8 is a schematic view showing another wavelength converter according to the present invention.

FIG. 8 illustrates another wavelength converter 51 embodying the present invention. A walk-of angle compensator is taken into the wavelength converter 41. Disk-shaped wavelength converting elements 52 are alternately assembled with the disk-shaped heat conductive plates 43, and the disk-shaped wavelength converting elements 52 are arranged in such a manner as to have optical paths 53 180 degrees different between the adjacent two wavelength converters 52 with respect to optical axes 54. The arrangement of the wavelength converting elements 52 makes the influences of the walk-off invalid, and improves the converting efficiency of the wavelength converter 51.

Figure 9:
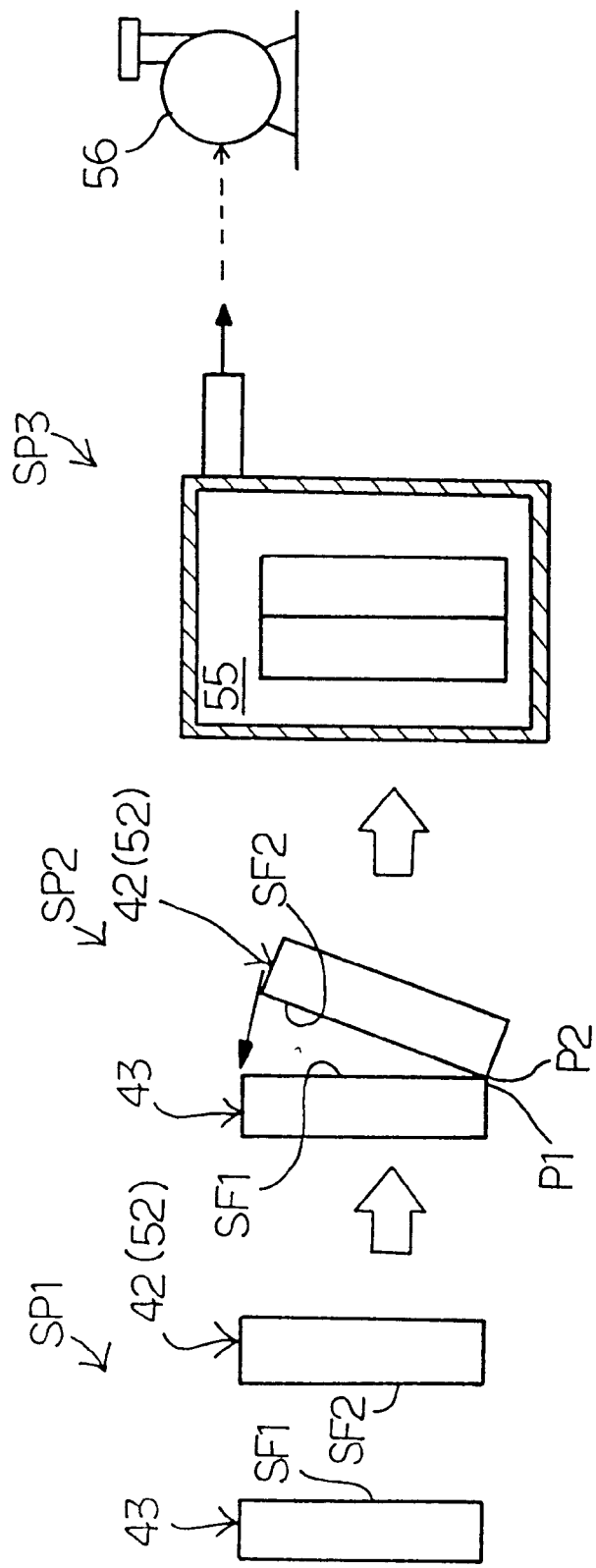
FIG. 9 is a flow chart showing an assemblage of a wavelength converting element and a heat conductive plate.

The disk-shaped wavelength converting elements 42/52 are assembled with the disk-shaped heat conductive plates 43 as shown in FIG. 9. First, the contact surface SF1 of the disk-shaped heat conductive plate 43 and the contact surface of the disk-shaped wavelength converting element 42/52 are polished until surface roughness of RIM5 Å (see step SP1).

Subsequently, a certain point P1 on the periphery of the disk-shaped heat conductive plate 43 is brought into contact with an appropriate point P2 on the periphery of the disk-shaped wavelength converting element 42/52, and the disk-shaped heat conductive plate 43 and the disk-shaped wavelength converting element 42/52 are brought close (see step SP2). As a result, the contact surfaces SF1 and SF2 are brought into contact with each other. If the disk-shaped heat conductive plate 43 is insufficiently fixed to the disk-shaped wavelength converting element 42/52, the disk-shaped heat conductive plate 43 and the disk-shaped wavelength converting element 42/52 are placed in a vacuum chamber 55, and a vacuum pump 56 evacuates the air from the vacuum chamber 55 (see step SP3). As a result, the van der Waals force are exerted between the contact surfaces SF1 and SF2, and the disk-shaped heat conductive plate 43 is assembled with the disk-shaped wavelength converting element 42/52. In this way, the optical contact is achieved between the disk-shaped heat conductive plate 43 and the disk-shaped wavelength converting element 42/52.

Evaluation

First Sample

The present inventor fabricated samples of the above described embodiments, and investigated wavelength converting characteristics. Although the present inventor used beta-$BaB_2O_4$ for the wavelength converting elements, the material with the nonlinear optical crystal was not limited to the beta-$BaB_2O_4$.

First, the present inventor investigated the transmittance of beta-$BaB_2O_4$ to 193 nm wavelength laser light in low temperature environment. The present inventor prepared a bulk of beta-$BaB_2O_4$, and a first sample of wavelength converting element was cut from the bulk. The first sample had an incident surface measuring 6 mm by 6 mm and the wavelength converting region of 5 mm long. The phase matching direction of the first sample was adjusted to 70.9 degrees so that the first sample was expected to generate the fourth optical harmonic from 772 nm wavelength laser light generated by a titanium contained sapphire crystal.

Figure 10:
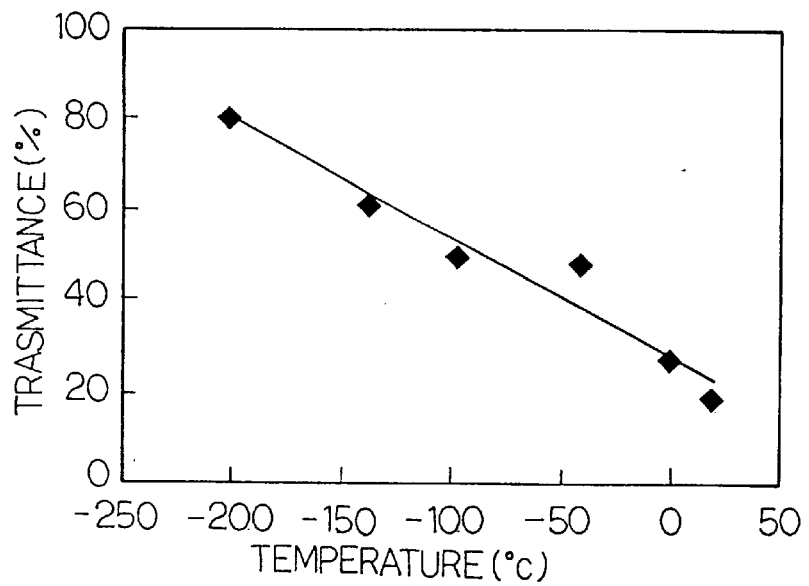
FIG. 10 is a graph showing a transmittance of a wavelength converter to 193 nm wavelength light in terms of temperature.

The present inventor accommodated the first sample in a copper holder, and cooled the copper holder toward −195 degrees in centigrade by using liquid nitrogen. The present inventor investigated the transmittance of the first sample to 193 nm wavelength light at different temperatures, and plotted the transmittance as shown in FIG. 10. The refractive index of beta-$BaB_2O_4$ to the 193 nm wavelength light was given by the following equations.

$$no^2 = 2.7359 + 0.01878/(\lambda^2 - 0.01822) - 0.01345 \lambda^2$$

$$ne^2 = 2.3753 + 0.01224/(\lambda^2 - 0.01667) - 0.01516 \lambda^2$$

Then, no was 1.929329, and ne was 1.723228. The first sample had the reflectance R to extraordinary ray, i.e., $(1-n)^2/(1+n)^2$ at 10 percent, and the reflectance to the transmitted ray was of the order of 20 percent. As will be understood from FIG. 10, the transmittance at −195 degrees in centigrade was 80 percent. We had to take the surface reflection into account. We concluded that the first sample absorbed a negligible amount of 193 nm wavelength light.

Figure 11:
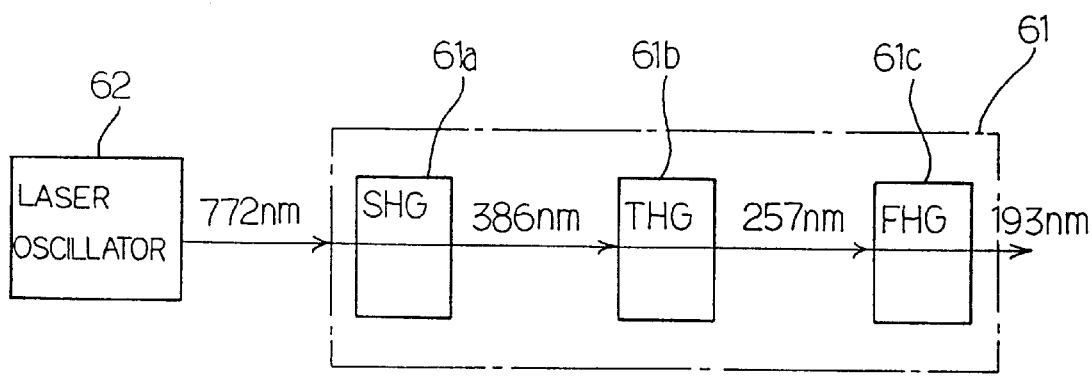
FIG. 11 is a block diagram showing a first sample of the wavelength converter for generating 193 nm wavelength laser light according to the present invention.

The present inventor fabricated a wavelength converter 61 for converting 772 nm wavelength laser light to 193 nm wavelength laser light as shown in FIG. 11. A laser oscillator 62 was formed by a titanium-contained sapphire crystal, and generated the 772 nm wavelength laser light at 1 watt.

The wavelength converter 61 had a second harmonic generator 61a, a third harmonic generator 61b and a fourth harmonic generator 61c. The second harmonic generator 61a, the third harmonic generator 61b and the fourth harmonic generator 61c were respectively abbreviated as "SHG", "THG" and "FHG" in FIG. 11.

The second harmonic generator 61 a was formed of type-I $LiB_3O_5$, and the type-I $LiB_3O_5$ crystal was cut long the phase matching direction of 36.5 degrees. The 772 nm wavelength laser light was incident on the second harmonic generator 61a, and the second harmonic generator 61a generated the second optical harmonic of the 772 nm wavelength laser light, and the second optical harmonic had 386 nm wavelength.

The third harmonic generator 61b was formed of type-I $BaB_2O_4$, and the type-I $BaB_2O_4$ was cut long the phase matching direction of 46.4 degrees. The third harmonic generator 61b generated the third optical harmonic of 257.3 nm wavelength.

The fourth harmonic generator 61c was formed of type-I $BaB_2O_4$, and the type-I $BaB_2O_4$ was cut long the phase matching direction of 70.9 degrees. The fourth harmonic generator 61c carried out the optical mixing on the 772 nm wavelength laser light and the third optical harmonic of 257.3 nm wavelength, and generated the fourth optical harmonic of 193 nm.

Figure 12:
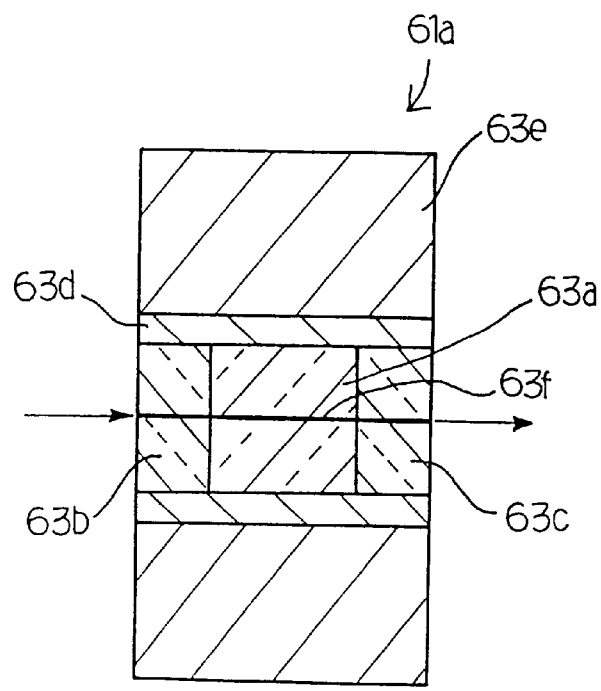
FIG. 12 is a cross sectional view showing a second harmonic generator incorporated in the wavelength converter shown in FIG. 11.

The second harmonic generator 61a had a wavelength converting element 63a formed from the type-I $LiB_3O_5$ crystal as shown in FIG. 12, and the wavelength converting element 63a measured 4 mm×4 mm×10 mm. Heat conductive plates 63b/63c were held in contact with an incident surface and an outlet surface of the wavelength converting element 63a through the optical contact (see FIG. 9), and were formed of sapphire. The wavelength converting element 63a sandwiched between the heat conductive plates 63b/63c was snugly received in a copper holder 63d, and the copper holder 63d was embedded in a Peltier element 63e. The Peltier element 63e maintained the copper holder 63d and, accordingly, the wavelength converting element 63a sandwiched between the heat conductive plates 63b/63c at 30 degrees in centigrade. Although the sapphire had a uniaxial crystal, the heat conductive plates 63b/63c were cut in the perpendicular direction to the optical axis, i.e., c-plate so as to prevent the laser light and the optical harmonic propagated along an optical path 63f from the optical influences of the heat conductive plates 63b/63c.

Figure 13:
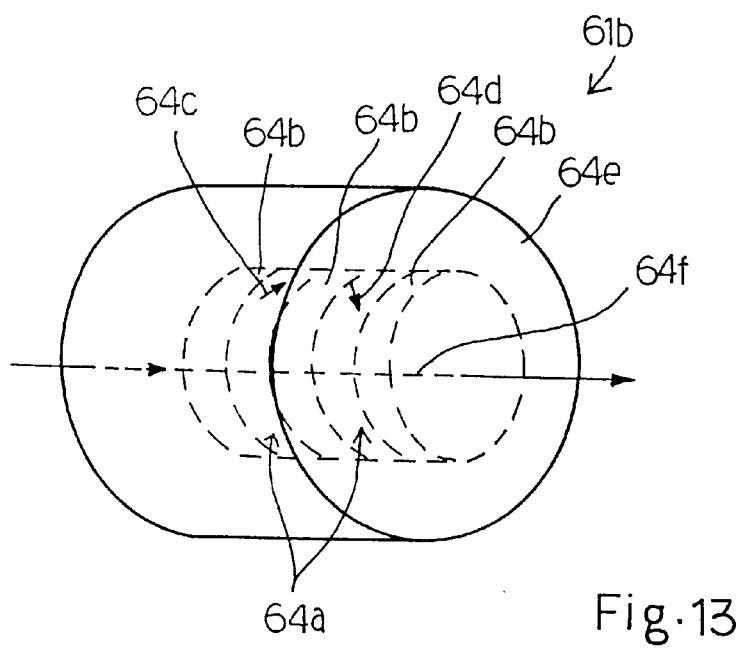
FIG. 13 is a schematic view showing a third harmonic generator incorporated in the wavelength converter.

The third harmonic generator 61b had two disk-shaped wavelength converting elements 64a and three disk-shaped heat conductive plates 64b alternately held in optical contact with the disk-shaped wavelength converting elements 64a as shown in FIG. 13. The disk-shaped wavelength converting elements were formed from the $BaB_2O_4$ crystal, and were 2 mm in thickness and 4 mm in diameter. The heat conductive plates 64b were formed from the sapphire crystal, i.e., the c-plate, and the optical axes 64c/64d were regulated in such a manner as to compensate the walk-off. The wavelength converting elements 64a and the heat conductive plates 64b were snugly received in a Peltier element 64e, and the Peltier element 64e maintained the wavelength converting elements 64a and the heat conductive plates 64b at 30 degrees in centigrade. An optical path 64f passed through the wavelength converting elements 64a and the heat conductive plates 64b.

Figure 14:
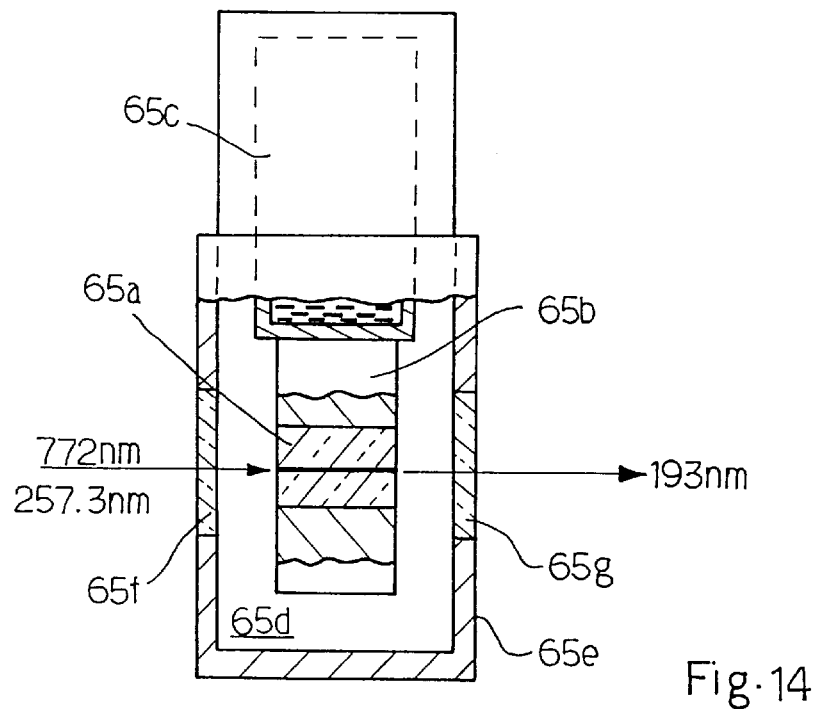
FIG. 14 is a partially cut-away schematic view showing a fourth harmonic generator incorporated in the wavelength converter.

The fourth harmonic generator 61c had a disk-shaped wavelength converter 65a retained by a copper cold finger 65b as shown in FIG. 14. The copper cold finger 65b was cooled by liquid nitrogen stored in a reservoir tank 65c, and the wavelength converting element 65a, the copper cold finger 65b and the reservoir tank 65c were accommodated in a vacuum chamber 65d. The liquid nitrogen cooled the wavelength converting element 65a to about −195 degrees in centigrade. Openings were formed in a wall defining the vacuum chamber 65d, and were aligned with an incident surface and an outlet surface of the wavelength converting element 65a. The openings were closed by sapphire plates 65f/65g, respectively.

The wavelength converting element 65a was cut from the $BaB_2O_4$ crystal, and was 5 mm in thickness and 6 mm in diameter.

Figure 15:
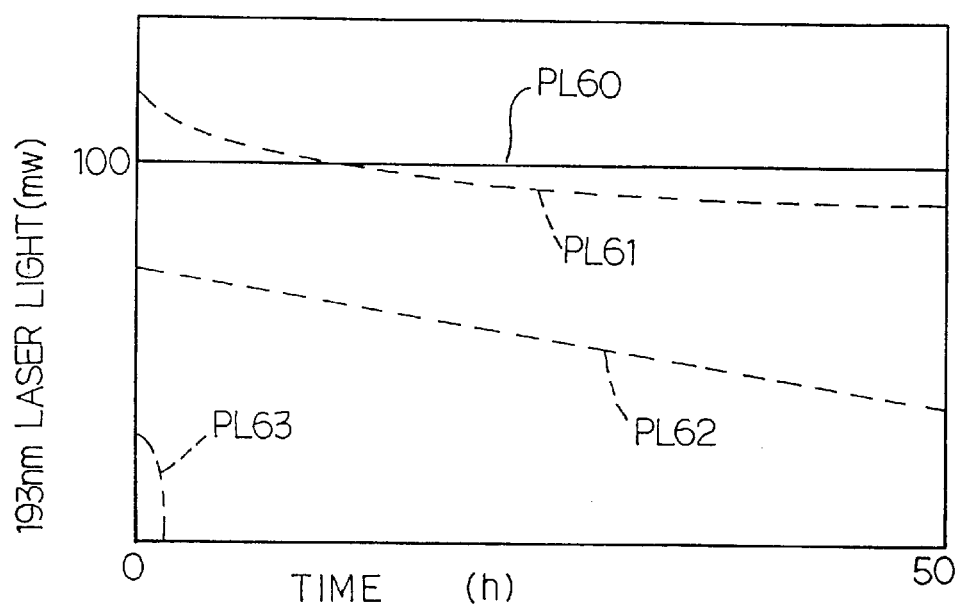
FIG. 15 is a graph showing the output light power of the wavelength converter and comparative samples.

The laser oscillator 62 radiated the 772 nm wavelength laser light to the first sample 61. The wavelength converter 61 stably generated the 193 nm wavelength laser light at 100 milliwatt for 50 hours as indicated by plots PL60 (see FIG. 15). Thus, the present inventor confirmed the stability of the wavelength converter according to the present invention.

In order to evaluate the cooling means and the walk-off compensating means, the present inventor further fabricated comparative samples, and investigated the wavelength converting characteristics of the comparative samples.

The second harmonic generator 61b was replaced with a second harmonic generator, which did not have any heat conductive plate. The second harmonic generator in the first comparative sample did not reflect the incident laser light on the boundary between the heat conductive plate 63b and the wavelength converter 63a, and increased the light power of the 193 nm wavelength light in an initial stage of the wavelength conversion. However, the optical path 63f raised the temperature, and the light power was gradually decreased as indicated by plots PL61.

For the second comparative sample, the third harmonic generator 61b was replaced with a third harmonic generator, which did not have any disk-shaped heat conductive plate. Therefore, the third harmonic generator of the second comparative sample was implemented by a single wavelength converting element cut from the $BaB_2O_4$ crystal, and was 8 mm in thickness and 4 mm in diameter.

The walk-off seriously affected the wavelength converting characteristics of the second comparative sample, and the light output power was decreased by 30 percent at the initiation of the wavelength conversion. The second comparative sample gradually decreased the light output power of the 193 nm wavelength laser light as indicated by plots PL62 due to the temperature rise.

For the third comparative sample, the fourth harmonic generator 61c was replaced with a fourth harmonic generator without the cooling system. The absorption spectrum in the fourth harmonic generator was shifted to the ling wavelength side, and generated 213 nm wavelength light. The third comparative sample was generating the 213 nm wavelength light at room temperature. The light output power was less than 20 percent of the light output power of the first sample, and was rapidly decreased as indicated by plots PL63. The present inventor investigated the fourth harmonic generator, and found the dielectric breakdown due to the absorption of the 193 nm wavelength light.

As will be understood from the foregoing description, the cooling means and the walk-off compensating means allow the wavelength converter to stably generate a converted light at a high converting efficiency. The wavelength converter shown in FIG. 11 is available for fabrication of semiconductor integrated circuit devices and medical equipment. Especially, the wavelength converter would supersede the Ar-F excimer laser generator.

Second Sample

Figure 16:
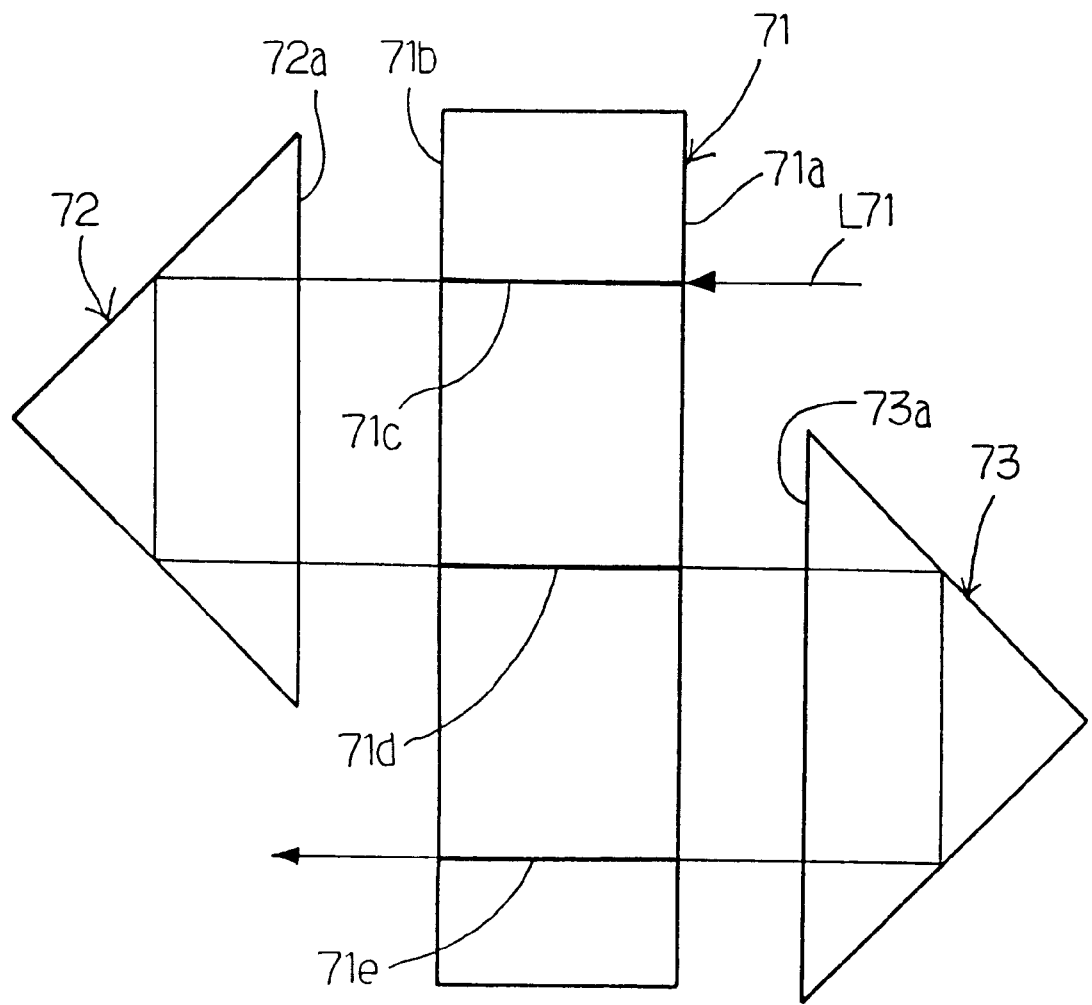
FIG. 16 is a schematic view showing a second sample of the wavelength converter according to the present invention.

The present inventor further fabricated a second sample shown in FIG. 16. The second sample was categorized in the first embodiment. The second sample was designed to generate the fourth optical harmonic of 1064 nm wavelength laser light L71. The 1064 nm wavelength laser light was emitted from a neodymium-contained YAG (Yttrium Aluminum Garnet) crystal. A wavelength converting element 71 was cut from the $BaB_2O_4$ bulk so as to match incident direction with the phase matching direction of 47.6 degrees so as to generate the fourth optical harmonic. The wavelength converting element 71 was shaped in a rectangular parallelopiped configuration. The wavelength converting element 71 was 3 mm thick, and had an incident surface 71a of 5 mm×10 mm and an outlet surface 71b equal in dimensions to the incident surface 71a. Quartz prisms 72 and 73 had respective incident surfaces 72a/73a, and were shaped into a triangular prism configuration similar to that of the first embodiment.

The quartz prisms 72/73 were opposed to the incident surface 71a and the outlet surface 71b, respectively, and the quartz prism 73 was appropriately offset from the other quartz prism 72. For this reason, the quartz prisms 72/73 formed a first wavelength converting region 71c, a second wavelength converting region 71d and a third wavelength converting region 71e between the incident surface 71a and the outlet surface 71b. Thus, the quartz prisms 72/73 prolonged the total length of the wavelength converting region.

The second optical harmonic of the 1064 nm wavelength laser light was incident on the incident surface 71a, and had 1 mm in diameter. The second optical harmonic had 532 nm wavelength, and the light power was 5 watts. The first, second and third wavelength converting regions 71c/71d/71e generated the fourth optical harmonic, and the fourth optical harmonic was radiated from the outlet surface 71b at 1.5 watts.

The present inventor removed the quartz prisms 72/73 from the positions opposed to the incident surface 71a and the outlet surface 71b, and the second optical harmonic was incident onto the incident surface 71a. The fourth optical harmonic was generated in the first wavelength converting region 71c only. The walk-off was serious, and the light output was only 500 milliwatt. Thus, the second sample increased the light output three times more than the light output of the comparative sample.

Third Sample

Figure 17:
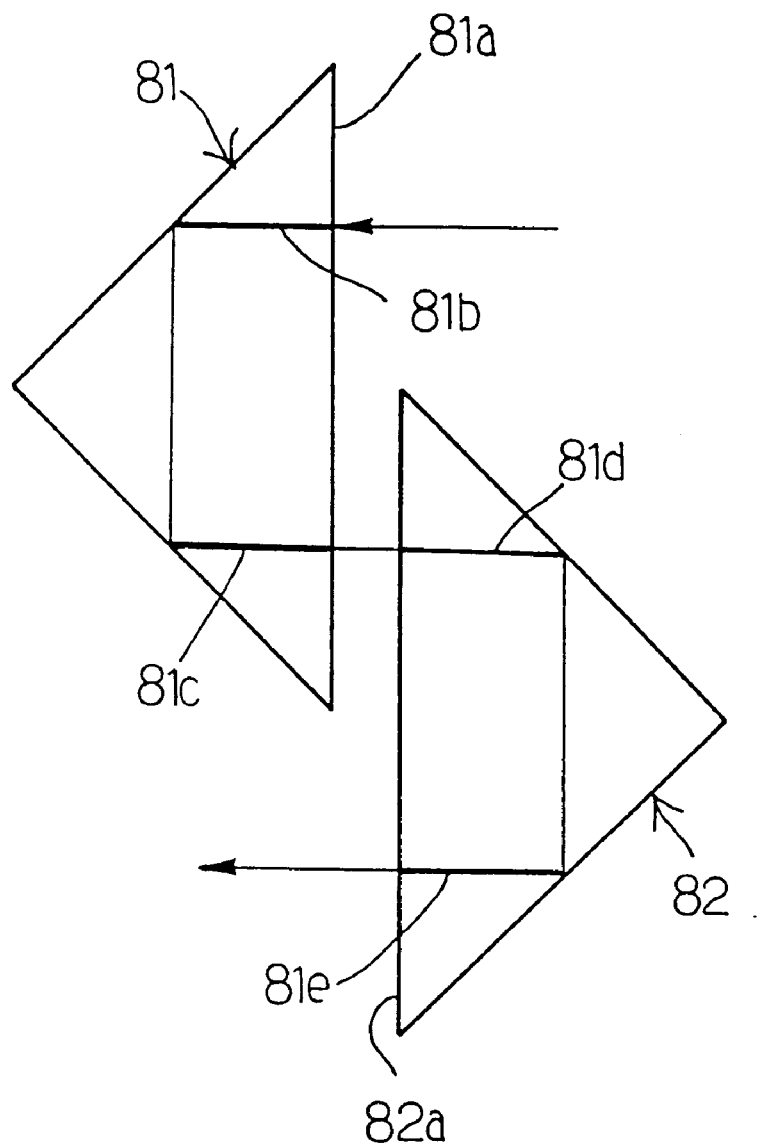
FIG. 17 is a schematic view showing a third sample of the wavelength converter according to the present invention.

The present inventor further fabricated a third sample shown in FIG. 17, and the third sample was categorized in the second embodiment. The third sample was cut from the type-I $BaB_2O_4$ bulk, and was designed to generate the third optical harmonic of the 1064 nm wavelength laser light emitted from the neodymium-contained YAG crystal. The third optical harmonic was generated at the phase matching angle of 31 degrees, and the incident angle was adjusted to the phase matching angle.

The third sample had two wavelength converting elements 81/82, which were similar in configuration to the wavelength converting element 11. The wavelength converting elements 81/82 had respective incident surfaces 81a/82a appropriately offset from each other, and a first wavelength converting region 81b, a second wavelength converting region 81c, a third wavelength converting region 81d and a fourth wavelength converting region 81e were formed in the wavelength converting elements 81/82 as shown.

The 1064 nm wavelength laser light and 532 nm wavelength light were radiated onto the incident surface 81a at 1 watt, and was propagated through the first wavelength converting region 81a to the fourth wavelength converting region 81e. The walk-off angle was compensated, and 355 nm wavelength converted light was output from the outlet surface 82a at 500 milliwatt.

The present inventor fabricated a comparative sample, which had a wavelength converting region of 8 mm. The 1064 nm wavelength laser light and the 532 nm wavelength light were radiated onto the incident surface of the comparative sample at 1 watt, and the comparative sample outputted 355 nm wavelength light at 350 milliwatt. Thus, the output power of the comparative sample was only 70 percent of the third sample.

Fourth Sample

Figure 18:
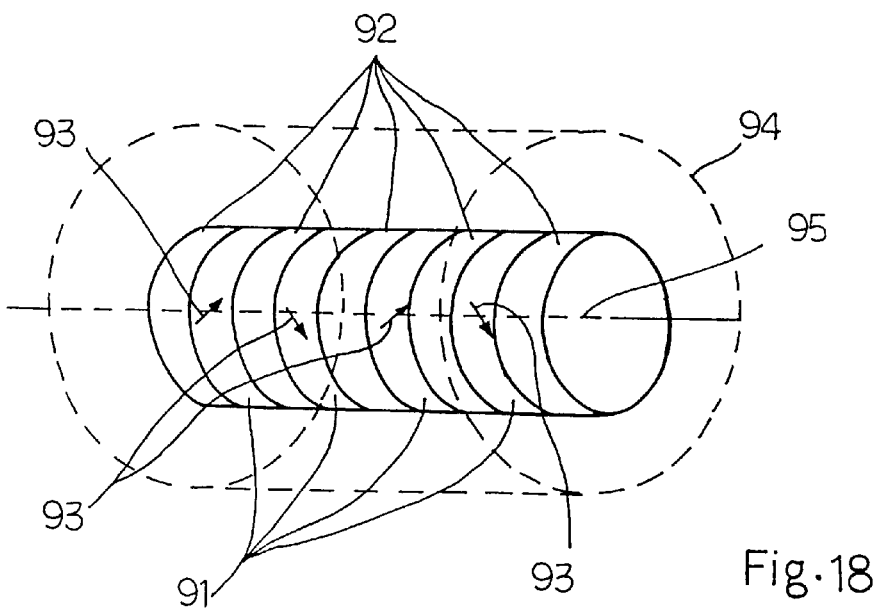
FIG. 18 is a schematic view showing a fourth sample of the wavelength converter according to the present invention.
Figure 20:
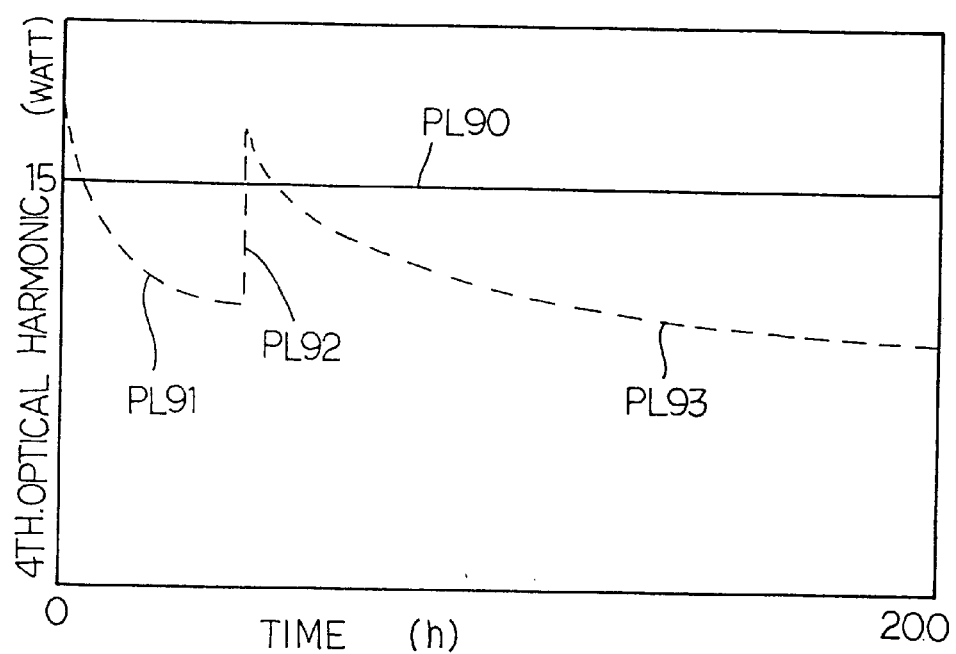
FIG. 20 is a graph showing the wavelength converting characteristics of the fourth sample and a comparative sample.

The present inventor fabricated a fourth sample, which was categorized in the sixth embodiment. The fourth sample had four disk-shaped wavelength converting elements 91 and four disk-shaped heat conductive plates 92 as shown in FIG. 18. The disk-shaped wavelength converting elements 91 were cut from single crystal $BaB_2O_4$ bulk, and were designed to generate the fourth optical harmonic of the laser light emitted from the neodymium-contained YAG crystal. The incident direction was aligned with the phase matching direction at 47.6 degrees, and the disk-shaped wavelength converting elements 91 were 2 mm thick and 6 mm in diameter. The optical axes 93 were adjusted in such a manner as to compensate the walk-off angle. The disk-shaped heat conductive plates 92 were formed of sapphire, and had dimensions equal to those of the disk-shaped wavelength converting elements 91. The circular surfaces of the wavelength converting elements 91 and the circular surfaces of the heat conductive plates 92 were polished, and the surface roughness was not greater than RIM5 Å. The parallelism was not greater than 5 seconds. The wavelength converting elements 91 and the heat conductive plates 92 were alternately held in optical contact with one another, and were inserted into a Peltier element 94. The Peltier element 94 cooled the wavelength converting elements 91 to 25 degrees in centigrade.

Figure 19:
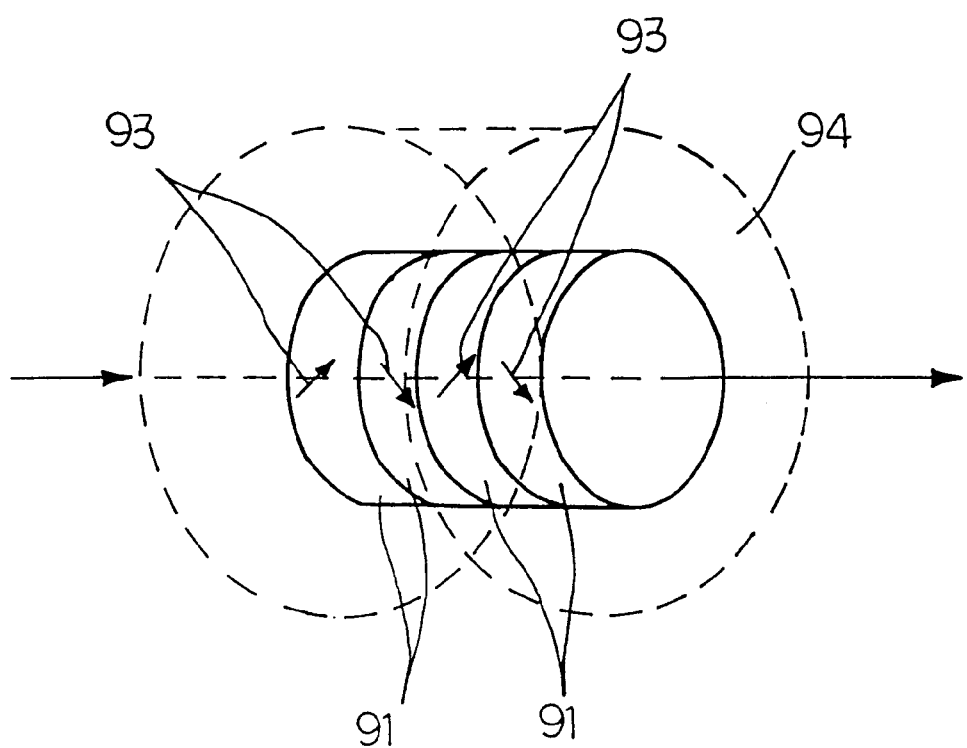
FIG. 19 is a schematic view showing a comparative sample for the fourth sample.

The present inventor further fabricated a comparative sample shown in FIG. 19. The comparative sample was implemented by the disk-shaped wavelength converting elements 91 only. Although the disk-shaped wavelength converting elements 91 were cooled by the Peltier element 94, the disk-shaped heat conductive plates 92 were removed from the comparative sample. The Peltier element 94 maintained the disk-shaped wavelength converting elements 91 at 25 degrees in centigrade.

The 1064 nm wavelength laser light was incident into a wavelength converter, and was the wavelength converter generated the second optical harmonic of 532 nm wavelength. The second harmonic was radiated from the wavelength converter to the fourth sample at 50 watts, and the fourth sample outputted 266 nm wavelength light at 15 watts for 200 hours. The light output was substantially constant, and the variance was within ±1 percent. The stable wavelength conversion was achieved by virtue of the temperature control at 25 degrees in centigrade and the desirable phase matching conditions.

The 532 nm wavelength laser light was radiated to the comparative sample at 50 watts. The comparative sample achieved light output of 17 watts at the initiation of the wavelength conversion. This was because of the fact that the comparative sample was free the reflection on the boundary between the wavelength converting elements 91 and the heat conductive plates 92. After several minutes, the comparative sample decreased the light output to 12 watts as indicated by plots PL91. When the light output reached 12 watts, the present inventor regulated the angle of the wavelength converting elements 91. Then, the comparative sample increased the light output to 16 watts as indicated by plots PL92. However, the comparative sample gradually decreased the light output as indicated by plots PL93, and reached to 12 watts at 200 hours. Thus, the comparative sample did not stably generate the fourth optical harmonic. The reason for the decay was variation of the refractive index due to temperature dispersion along the optical path 95. Even though the angle was readjusted, the refractive index was varied again due to the heat. From the comparison between the fourth sample and the comparative sample, it is understood that the heat conductive plates 92 were effective against the variation of refractive index. In other words, the fourth sample achieved the high converting efficiency with the assistance of the heat conductive plates 92.

As will be appreciated from the foregoing description, the cooling system 65b/65c/65d cools down the wavelength converting element 65a for shifting the absorption edge toward a short wavelength as shown in FIGS. 1 and 2, and enhances the transmittance of the wavelength converting element 65a. As a result, the wavelength converting element 65a increases the converting efficiency. Thus, the cooling system serves as a spectrum shifter.

The heat conductive plates 23a/23b, 32, 43, 63b/63c, 64b and 92 absorb the heat directly from the wavelength converting regions, and keep the refractive index of the wavelength converting regions constant. As a result, the phase matching conditions are maintained, and the converting efficiency is increased. Thus, the heat conductive plates and the associated temperature controller as a whole constitute a heat sink.

The reflecting surfaces 2b/2c and 11c/11d allow the wavelength converting element 1, 11, 71 and 81/82 to provide the plural wavelength converting regions 180 degrees different from each other with respect to the optical axes thereof. As a result, the walk-off angle is compensated, and the wavelength converting element increases the converting efficiency. Thus, the reflecting surface or surfaces and the crystal orientations of the wavelength converting elements serve as a walk-of angle compensator. The crystal orientations of the wavelength converting elements 52, 64a and 91 also compensate the walk-of angle, and serve as the walk-off angle compensator.

Although particular embodiments of the present invention have been shown and described, it will be apparent to those skilled in the art that various changes and modifications may be made without departing from the spirit and scope of the present invention.

For example, the spectrum shifter, the heat sink and the walk-of angle compensator may be provided for a wavelength converting element having any kind of nonlinear optical crystal such as, for example, $LiNbO_3$, $LiIO_3$, $KTiOPO_4$, $LiB_3O_5$ or KDP.

Any kind of cooling system is available for the present invention. Any combination between the spectrum shifter, the heat sink and the walk-of angle compensator is applicable to the wavelength converting element or elements.

What is claimed is:

1. A wavelength converter comprising:
   a wavelength converting path formed of a material having a nonlinear optical crystal for generating an optical harmonic of an incident light; and
   a spectrum shifter having a cooling system cooling said wavelength converting path for changing a part of an absorption spectrum in the vicinity of an absorption edge toward a shorter wavelength.

2. The wavelength converter as set forth in claim 1, in which said cooling system cools said wavelength converting path to a low temperature equal to or less than zero degrees centigrade.

3. The wavelength converter as set forth in claim 2, in which said wavelength converting path is formed in a $BaB_2O_4$ crystal.

4. A wavelength converter comprising:
   a wavelength converting oath formed of a material having a nonlinear optical crystal for generating an optical harmonic of an incident light; and
   a converting efficiency increasing means including:
   a walk-off angle compensator for making influences of a walk-off phenomenon between a first part of said wavelength converting path and a second part of said wavelength converting path invalid; and
   a spectrum shifter for changing a part of an absorption spectrum in the vicinity of an absorption edge toward a shorter wavelength.

5. The wavelength converter as set forth in claim 4, in which said walk-off angle compensator includes a first nonlinear optical crystal having said first part of said wavelength converting path and a first optical axis and a second nonlinear optical crystal having said second part of said wavelength converting path and a second optical axis, and a relation between said first part of said wavelength converting path and said first optical axis is 180 degrees from a relation between said second part of said wavelength converting path and said second optical axis.

6. The wavelength converter as set forth in claim 5, in which said first nonlinear optical crystal and said second nonlinear optical crystal are spaced so as to align said first part of said wavelength converting path with said second part of said wavelength converting path, and said first optical axis is 180 degrees different from said second optical axis.

7. The wavelength converter as set forth in claim 5, in which said walk-off angle compensator further includes at least one reflecting surface so as to guide said incident light and a partially converted light generated from said incident light from said first part of said wavelength converting path to said second part of said wavelength converting path, and said first nonlinear optical crystal and said second nonlinear optical crystal form parts of a single nonlinear optical crystal bulk having said first optical axis and said second optical axis oriented in a certain direction.

8. The wavelength converter as set forth in claim 7, in which said at least one reflecting surface is formed by two surfaces of a prism.

9. The wavelength converter as set forth in claim 8, in which said prism is formed of a material transparent to said incident light and said partially converted light, and said single nonlinear optical crystal bulk radiates said incident light and said partially converted light from said first part of said wavelength converting path to said prism and receives a reflected light at one end of said second part of said wavelength converting path.

10. The wavelength converter as set forth in claim 8, in which said single nonlinear optical crystal bulk is shaped into said prism.

11. The wavelength converter as set forth in claim 4, in which said spectrum shifter cools said wavelength converting path to a low temperature equal to or less than zero degrees centigrade, said walk-off angle compensator includes a first nonlinear optical crystal having said first part of said wavelength converting path and a first optical axis and a second nonlinear optical crystal having said second part of said wavelength converting path and a second optical axis, and a relation between said first part of said wavelength converting path and said first optical axis is 180 degrees from a relation between said second part of said wavelength converting path and said second optical axis.

12. The wavelength converter as set forth in claim 11, in which said first nonlinear optical crystal and said second non-linear optical crystal form parts of a nonlinear optical crystal bulk shaped in a prism and having said first optical axis and said second optical axis directed to a certain direction, and said prism has an incident surface, a first reflecting surface for reflecting said incident light and a partially converted light generated from said incident light from said first part of said wavelength converting path to a certain direction and a second reflecting surface receiving said incident light and said partially converted light from said first reflecting surface for reflecting said incident light and said partially converted light to said second part of said wavelength converting path.

13. A wavelength converter comprising:
   a wavelength converting path formed of a material having a nonlinear optical crystal for generating an optical harmonic of an incident light;
   a walk-off angle compensator for making influences of a walk-off phenomenon between first part of said wavelength converting path and a second part of said wavelength converting path invalid; and a heat sink providing a part of an optical path propagating said incident light for directly absorbing heat generated in said wavelength converting path.

14. The wavelength converter as set forth in claim 13, in which said heat sink includes
a heat conductive plate having a heat conductivity larger than a heat conductivity of said wavelength converting path and providing said part of said optical path aligned with said wavelength converting path, and
a temperature controller connected to said heat conductive plate for keeping said heat conductive plate lower in temperature than said wavelength converting path.

15. The wavelength converter as set forth in claim 14, in which said heat conductive plate is formed of material selected from the group consisting of diamond, alumina, quartz, garnet and sapphire.

16. The wavelength converter as set forth in claim 14, in which said temperature controller has a Peltier element for absorbing said heat from said wavelength converting path through said heat conductive plate.

17. The wavelength converter as set forth in claim 14, in which said wavelength converting path is formed in a single wavelength converting element having an incident surface, and said heat conductive plate is attached to said incident surface so as to align said optical path with said wavelength converting path.

18. The wavelength converter as set forth in claim 14, in which said wavelength converting path is intermittently formed in a plurality of wavelength converting elements spaced from one another, and said heat conductive plate is implemented by a plurality of heat conductive sub-plates alternately inserted between said plurality of wavelength converting elements.

19. The wavelength converter as set forth in claim 13, in which said heat sink absorbs heat generated in said wavelength converting path, said walk-off angle compensator includes a first nonlinear optical crystal having said first part of said wavelength converting path and a first optical axis and a second nonlinear optical crystal having said second part of said wavelength converting path and a second optical axis, and a relation between said first part of said wavelength converting path and said first optical axis is 180 degrees from a relation between said second part of said wavelength converting path and said second optical axis.

20. The wavelength converter as set forth in claim 19, in which said first nonlinear optical crystal and said second non-linear optical crystal form parts of a nonlinear optical crystal bulk shaped in a prism and having said first optical axis and said second optical axis directed to a certain direction, and said prism has an incident surface, a first reflecting surface for reflecting said incident light and a partially converted light generated from said incident light from said first part of said wavelength converting path to a certain direction and a second reflecting surface receiving said incident light and said partially converted light from said first reflecting surface for reflecting said incident light and said partially converted light to said second part of said wavelength converting path.

21. The wavelength converter as set forth in claim 19, in which said heat sink includes a plurality of heat conductive plates larger in heat conductivity than said first nonlinear optical crystal and said second nonlinear optical crystal and held in optical contact between said first nonlinear optical crystal and said second non-linear optical crystal, and said first part of said wavelength converting path is aligned with said second part of said wavelength converting path so that said first optical axis is 180 degrees different from said second optical axis.

22. The wavelength converter as set forth in claim 13, in which said first part of said wavelength converting path generates a certain optical harmonic of said incident light, and said second part of said wavelength converting path generates another optical harmonic of said incident light from the outlet light of said first part.

23. The wavelength converter as set forth in claim 22, in which said wavelength converting path further has a third part for generating yet another optical harmonic from said another optical harmonic.

24. The wavelength converter as set forth in claim 23, in which said incident light, said certain optical harmonic, said another optical harmonic and said yet another optical harmonic have wavelengths of 772 nm, 386 nm, 257 nm, and 193 nm, respectively.

25. The wavelength converter as set forth in claim 13, in which said walk-off angle compensator includes a first nonlinear optical crystal having said first part of said wavelength converting path and a first optical axis and a second nonlinear optical crystal having said second part of said wavelength converting path and a second optical axis, and a relation between said first part of said wavelength converting path and said first optical axis is 180 degrees from a relation between said second part of said wavelength converting path and said second optical axis.

26. The wavelength converter as set forth in claim 25, in which said first nonlinear optical crystal and said second nonlinear optical crystal are spaced so as to align said first part of said wavelength converting path with said second part of said wavelength converting path, and said first optical axis is 180 degrees different from said second optical axis.

27. The wavelength converter as set forth in claim 25, in which said walk-off angle compensator further includes at least one reflecting surface so as to guide said incident light and a partially converted light generated from said incident light from said first part of said wavelength converting path to said second part of said wavelength converting path, and said first nonlinear optical crystal and said second nonlinear optical crystal form parts of a single nonlinear optical crystal bulk having said first optical axis and said second optical axis oriented in a certain direction.

28. The wavelength converter as set forth in claim 27, in which said at least one reflecting surface is formed by two surfaces of a prism.

29. The wavelength converter as set forth in claim 28, in which said prism is formed of a material transparent to said incident light and said partially converted light, and said single nonlinear optical crystal bulk radiates said incident light and said partially converted light from said first part of said wavelength converting path to said prism and receives a reflected light at one end of said second part of said wavelength converting path.

30. The wavelength converter as set forth in claim 28, in which said single nonlinear optical crystal bulk is shaped into said prism.

31. A wavelength converter comprising:
at least one wavelength converting element comprising a material having a nonlinear optical crystal for generating an optical harmonic of an incident light; and
a heat sink comprising a plurality of heat-conductive plates including an incident plate, the incident plate being in direct contact with an incident surface of a first of the at least one wavelength converting elements, each of the heat-conductive plates having a passage therethrough which defines an optical path.

32. The wavelength converter of claim 31, further comprising a temperature controller connected to said heat-conductive plates.

33. The wavelength converter of claim 31 comprising a plurality of the wavelength converting elements, each having an exit surface, and wherein the heat-conductive plates and the wavelength converting elements are arranged alternately, with both the incident and exit surfaces of each of the wavelength converting elements being in direct contact with one of the heat-conductive plates so that the passages of the respective heat-conductive plates are optically aligned.

* * * * *